United States Patent
Nishi et al.

(10) Patent No.: US 6,755,206 B2
(45) Date of Patent: Jun. 29, 2004

(54) FUEL CUTOFF VALVE

(75) Inventors: Hiroshi Nishi, Aichi (JP); Tomohide Aoki, Aichi (JP); Hiroaki Kito, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 34 days.

(21) Appl. No.: 10/254,932

(22) Filed: Sep. 26, 2002

(65) Prior Publication Data

US 2003/0062083 A1 Apr. 3, 2003

(30) Foreign Application Priority Data

Sep. 28, 2001 (JP) .................................. P2001-300346

(51) Int. Cl.$^7$ ............................................. F16K 24/04

(52) U.S. Cl. ......................................... 137/202; 137/43

(58) Field of Search .................................. 137/43, 202

(56) References Cited

U.S. PATENT DOCUMENTS

| | | |
|---|---|---|
| 5,139,043 A | 8/1992 | Hyde et al. |
| 6,286,539 B1 | 9/2001 | Nishi et al. |
| 6,408,867 B2 * | 6/2002 | Aoki et al. .................. 137/202 |

FOREIGN PATENT DOCUMENTS

JP       A-2000-266208       9/2000

* cited by examiner

*Primary Examiner*—Gerald A. Michalsky
(74) *Attorney, Agent, or Firm*—Posz & Bethards, PLC

(57) ABSTRACT

A fuel cutoff valve comprises a casing, a cover having a cover supporting part for supporting an upper part of the casing, an O-ring disposed on an outer periphery of the casing, and a seal holding member. The seal holding part is constituted by a member made of a material having a high degree of shape stability, such as a polyamide, into which glass fibers are added. Further, the seal holding part is thermally welded to a welding end of a cover inner layer made of a modified polyamide.

9 Claims, 6 Drawing Sheets

FUEL CUTOFF VALVE

The present application is based on Japanese Patent Application No. 2001-300346, the entire contents of which are incorporated herein by reference.

BACKGROUND OF THE INVENTION

1. Field of the Invention

This invention relates to a fuel cutoff valve mounted on an upper part of a fuel tank and enabled to switch communication and cutoff between the fuel tank and the outside by opening and closing a connection conduit, which connects the inside of the fuel tank to the outside.

2. Related Art

Hitherto, there has been known such a kind of a fuel cutoff valve disclosed in JP-A-2000-266208 (corresponding to U.S. Pat. No. 6,286,539). FIG. 6 is a sectional view showing a conventional fuel cutoff valve. The fuel cutoff valve 110 is mounted on an upper part of a fuel tank FT and operative to switch communication and cutoff between the fuel tank FT and the outside by opening and closing a connection conduit 122, which connects the inside of the fuel tank to the outside. The fuel cutoff valve 110 comprises a casing 120, a float 130, and a cover 140. The cover 140 can be thermally welded to the upper part of the fuel tank FT and is made of a resin material having a higher fuel swelling property than the material of the casing 120. An engagement projection 126 formed on the casing 120 is engaged with an engagement hole 142 formed in the cover 140 as means for attaching the cover 140 to the casing 120. Moreover, a holding part 124 is formed in the casing 120. A fitting part 144 of the cover 140 is held by this holding part 144. In the valve of this configuration, when the fitting part 144 of the cover 140 is expanded owing to fuel swelling, the fitting part 144 is held by the holding part 124. At that time, when the cover 140 swells, the holding part 124 enhances a supporting force by increasing mechanical bond strength between the holding part 124 and the fitting part 144. Thus, such a holding part 124 provides stable opening/closing characteristics to the fuel cutoff valve 110.

However, the conventional fuel cutoff valve 110 has problems in that the structure of a mold for injection-molding of the holding part 124 and the fitting part 144 becomes complex and needs high dimensional accuracy.

SUMMARY OF THE INVENTION

The invention solves the problems of the conventional valve. Accordingly, an object of the invention is to provide a fuel cutoff valve, which does not have shakiness owing to fuel swelling and can obtain a stable valve-closing characteristic.

To solve the problems, according to the invention, there is provided a fuel cutoff valve adapted to be mounted on an upper part of a fuel tank for switching communication and cutoff between an inside and an outside of the fuel tank by opening and closing a connection conduit, the fuel cut off valve comprising:

a casing forming a valve chamber communicating with the fuel tank;

a cover including a cover welding end that is made of a first resin material, which is thermally weldable to the upper part of the fuel tank, and that is configured to be thermally welded to the upper part of the fuel tank, and a cover supporting part for supporting an upper part of the casing;

a valve element accommodated in the valve chamber to open and close the connection conduit;

a sealing member disposed on an outer periphery of the casing;

a seal holding member that is made of a second resin material, which is thermally weldable to the cover supporting part, and that has a higher shape stability against fuel than the cover, the seal holding member including a pressing face adapted to press the sealing member from an outside of the casing and a holding-member-side welding end configured to be thermally welded to the cover supporting part so as to press the sealing member, thereby sealing the inside of the fuel tank from the outside and supporting the casing.

The casing of the fuel cutoff valve according to the invention has a valve chamber communicating with the fuel tank. A valve element accommodated in this valve chamber rises and falls by increasing and decreasing a buoyant force according to the level of fuel contained in the fuel tank. Thus, the valves opens and closes the connection conduit to thereby prevent the fuel from flowing out of the fuel tank. Further, the cover is made of a resin material, which can be thermally welded to the upper part of the fuel tank, and thermally welded thereto, so that the fuel cutoff valve is mounted on the upper part of the fuel tank. Consequently, the fuel cutoff valve can easily be mounted on the upper part of the fuel tank without needing joining members.

The casing is made of a resin material that has a lower fuel swelling property than the cover. Thus, a seat face for opening and closing a fuel path can be formed with high accuracy. Further, the seal holding member thermally welded to the cover supporting part has a high degree of the shape stability against the fuel. Thus, even when exposed to the fuel, the seal holding member does not largely swell. Instead, the seal holding member reliably holds the sealing member by the pressing face so that high sealing ability is maintained. Incidentally, shape stability is defined as a combined property of the stiffness and the fuel swelling property of the member in a fuel atmosphere, indicating sealing and holding property to the casing.

Furthermore, the seal holding member is thermally welded to the cover supporting part. Thus, the sealing ability of the part provided therebetween is enhanced. Moreover, the supporting force for the casing can be increased. Therefore, the fuel cutoff valve does not cause troubles due to the shakiness. That is, the fuel cutoff valve can obtain stable opening/closing characteristics without causing reduction in impact resistance (i.e. mechanical strength against an impact) and variation in level of fuel when the fuel cutoff valve opens and closes.

The adding of a fibrous material thereinto, the use of a resin material that excels in fuel swelling resistance over the cover, and the embedding of an insert member can be taken as measures to increase the shape stability still more.

Further, the following resin materials are used for thermally welding the cover to the fuel tank, and for welding the seal holding member to the cover. That is, the casing is made of a material selected from a group consisting of polyacetal, polyamide, polyphenylene sulfide, and polybutylene terephthalate or of a blend of these materials of the group. The cover is made of polyethylene. The seal holding member is made of polyethylene, into which fibrous materials are added. Incidentally, the fibrous materials are glass fibers and asbestos fibers to be added thereto so as to improve the mechanical and dimensional stability against the fuel swelling without impairing the properties of the resin materials.

Further, as another preferred embodiment of the cover, the cover may be configured so as to have a cover inner layer, which is formed in such a manner as to face the connection conduit and to support the cover supporting part, and a cover outer layer that is formed by two-color molding and chemically bonded to this cover inner layer and has the cover welding end. In this case, the cover inner layer and the cover outer layer may be adapted so that the cover inner layer and the cover outer layer are made of different resin materials that are thermally welded to each other, that the cover inner layer is made of a resin material, which can be thermally welded to the seal holding member, and that the cover outer layer is made of a resin material, which can be thermally welded to the upper wall of the fuel tank. For example, the fuel cutoff valve may be adapted so that the casing is made of a material selected from the group consisting of polyacetal, polyamide, polyphenylene sulfide, and polybutylene terephthalate or of a blend of these materials of the group, that the cover outer layer is made of polyethylene, and that the cover inner layer is made of modified polyamide, which can be thermally welded to polyethylene, and that the seal holding member is made of polyamide. Incidentally, the chemical adhesion property between the modified polyamide and polyethylene can be added to the modified polyamide by adding a polar functional group of, for example, a maleic acid to the modified polyamide.

Further, the seal holding member can be formed by using an insert member, which is embedded so as to surround the sealing member, so that the seal holding member has a higher shape stability than the cover. The insert member can be embedded by embedding a metallic member or a resin material that differs from the rein material of the seal holding member.

Additionally, the seal holding member may be constituted so as to have a case cover that covers a side wall and a lower opening of the casing and that is integrally formed.

Further, the seal member has a ring-like shape and performs a sealing by compressed with the seal holding member in a radially inner direction thereof, which is perpendicular to a direction of thermally welding the casing to the cover.

DETAILED DESCRIPTION OF THE PREFERRED EMBODIMENTS

Hereinafter, preferred embodiments of the invention are described so as to clarify the aforesaid constitution and operation of the invention.

(First Embodiment)

Figure 1:
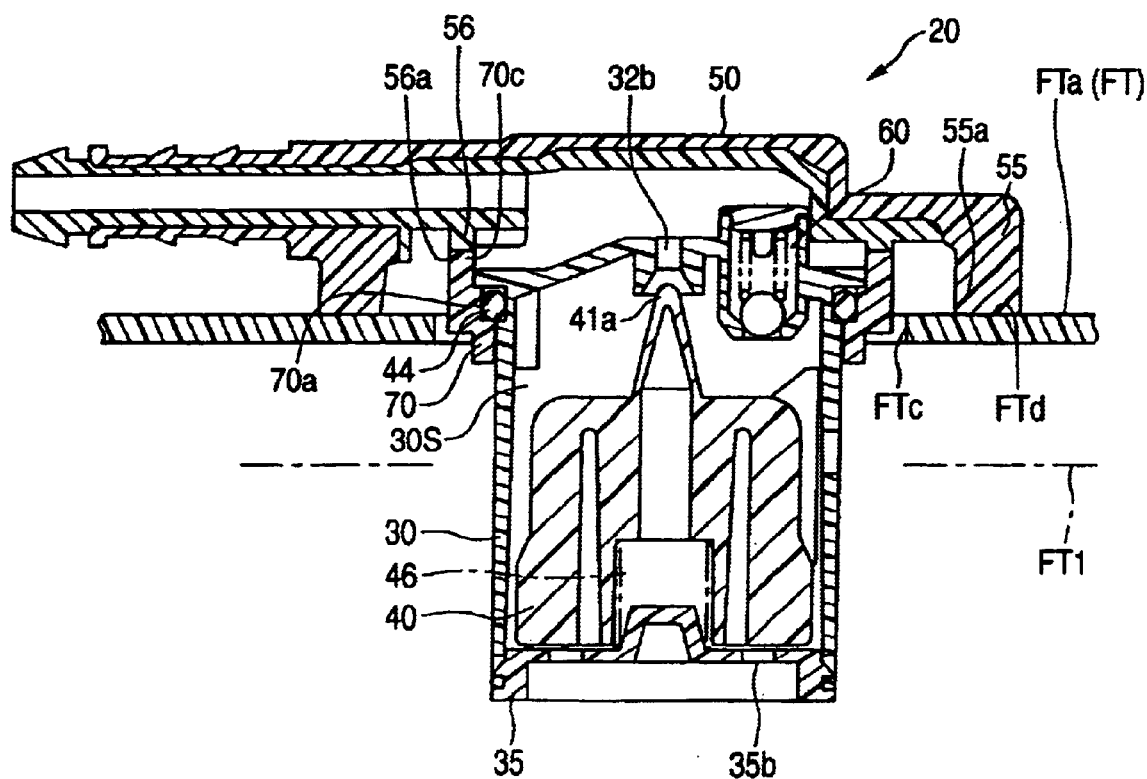
FIG. 1 is a sectional view showing a fuel cutoff valve 20 mounted on an upper part of a fuel tank FT of an automobile according to an embodiment of the invention.

FIG. 1 is a sectional view showing a fuel cutoff valve 20 mounted on the upper part of a fuel tank FT of an automobile, which is an embodiment of the invention. The fuel tank FT has surfaces made of a composite resin material including polyethylene. A mounting hole FTc is formed in an upper wall FTa of the tank FT. A fuel cutoff valve 20 is attached to this upper wall FTa in a condition in which a lower part of the fuel cutoff valve 20 is plunged into the mounting hole FTc. The fuel cutoff valve 20 is operative to restrain fuel from flowing out of the tank FT to an external case (that is, a canister) when the level of the fuel contained in the fuel tank FT rises to a predetermined level FL1 during refueling.

The fuel cutoff valve 20 is composed mainly of a casing 30, a bottom plate 35, a float 40, an O-ring 44 (that is, a sealing member), a spring 46, a cover 50, a check valve 60, and a seal holding member 70.

Figure 2:
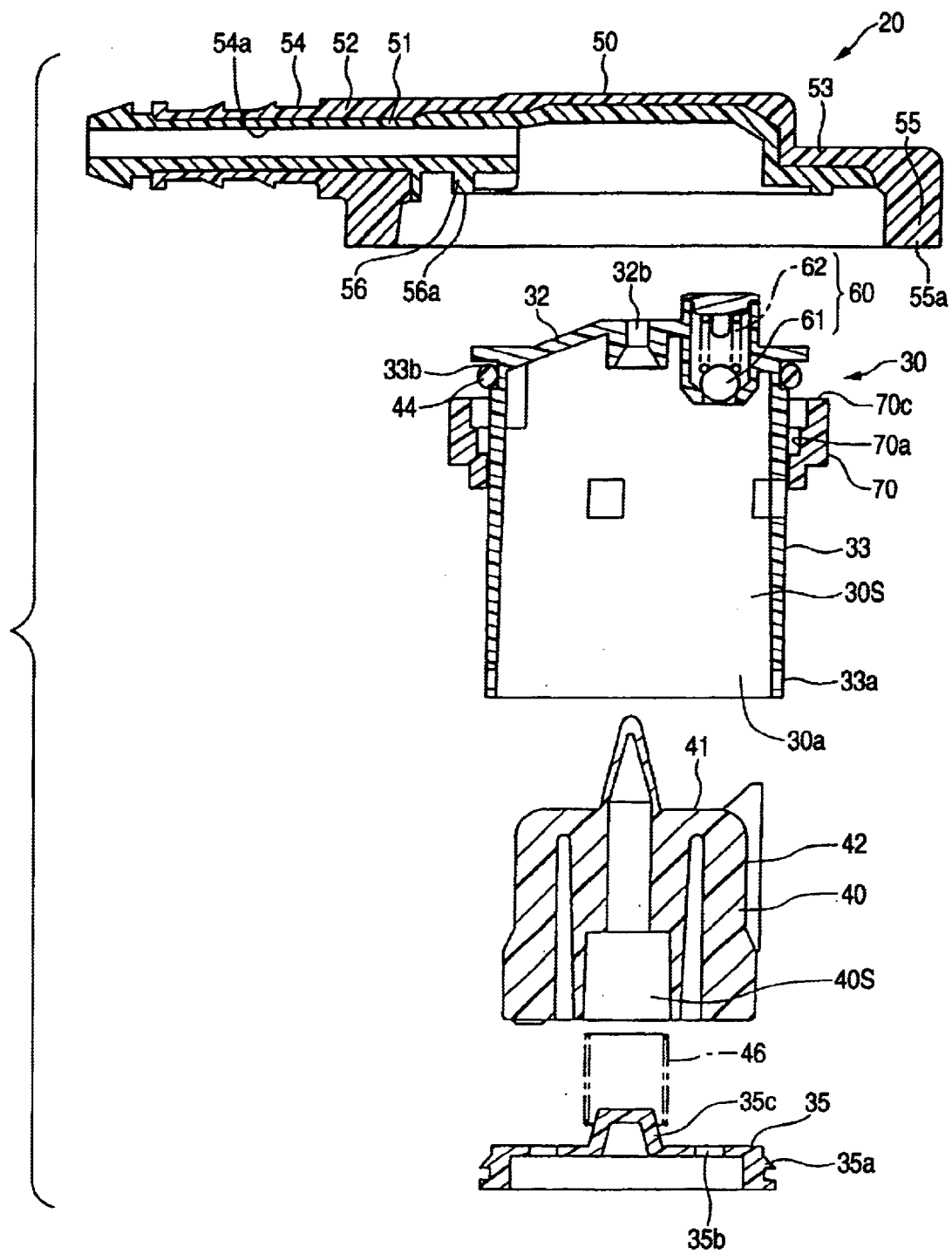
FIG. 2 is a decomposed view showing the fuel cutoff valve 20.

FIG. 2 is a decomposed sectional view showing the fuel cutoff valve 20. The casing 30 has a top wall part 32, and a side wall part 33 extended from this top wall part 32 downwardly and cylindrically. Further, a cup-like valve chamber 30S surrounded by the top wall part 32 and the side wall part 33 is formed and has a lower opening 30a opened in a lower part thereof.

A seal holding recess part 33b is formed in an upper outer periphery of the side wall part 33. In this seal holding recess part 33b, an O-ring 44 is supported. Further, in a lower portion of the side wall part 33, an engagement hole 33a is formed. As will be described later, this engagement hole 33a is used for attaching the bottom plate 35.

The bottom plate 35 is used for closing the lower opening 30a of the casing 30, and attached to the casing 30 by engaging the engagement part 35a, which is formed on the outer periphery thereof, with the engagement hole 33a in such a manner as to close the lower opening 30a. A communication hole 35b for causing a valve chamber 30S and the fuel tank FT to communicate with each other is formed in this bottom plate 35. Therefore, the fuel tank FT communicates with the valve chamber 30S through the communication hole 35b. Furthermore, a ring-like spring support part 35c is formed on the central top part of this bottom plate 35. A spring 46 is supported between an outer peripheral part of this spring support part 35c and the bottom surface of an inner recess part of the float 40.

Further, the float 40 accommodated in the valve chamber 30S is constructed like a container in such a way as to have an upper wall part 41, and a cylindrical sidewall part 42 formed in such a manner as to extend downwardly from the outer periphery of the upper wall part 41. An inner space is provided as a buoyancy chamber 40S for generating a buoyant force.

The casing 30, the bottom plate 35, and the float 40 are made of polyacetal or polyamide, which is a synthetic resin that excels in fuel oil resistance.

The cover 50 consists of two layers, that is, a cover inner layer 51, and a cover outer layer 52. The cover 50 has a cover body 53, a tubular body part 54 projecting sideways from the center of the cover body 53, a flange 55 formed on an outer periphery of the cover body 53, and a cover supporting part 56 provided on a lower part of the cover body 53 in such a way as to protrude therefrom. These components are integrally formed. A cover-side conduit 54a is formed in the tubular body part 54. This cover-side conduit 54a has an end connected to the connection conduit 32b of the casing 30, and also has the other end connected to a canister side. Further, a cover welding end 55a to be welded to the tank upper wall FTa of the fuel tank FT is formed in the bottom part of the flange 55.

The cover inner layer 51 is formed in such a way as to face the cover side conduit 54a, and has the cover supporting part 56. The cover outer layer 52 is formed by two-color molding, and reacts with and bonds to the cover inner layer 51, and has the cover welding end 55a. The cover outer layer 52 can be formed from polyethylene, while the cover inner layer 51 can be formed from modified polyamide that is welded to polyethylene. The modified polyamide is a resin material to which the chemical adhesion property between the modified polyamide and polyethylene is added by adding a polar functional group of, for example, a maleic acid thereto. These resin materials can be integrally formed by two-color molding. That is, the cover inner layer 51 can be made by heat of reaction to react with and bond to the cover outer layer 52 injecting modified polyamide, whose injection temperature is higher than that of polyethylene, so as to form the cover inner layer 51 after polyethylene is injected so as to form the cover outer layer 52.

The seal holding member 70 is a member fitted to the upper outer periphery of the casing 30 and thermally welded to an end of the cover 50, so that the seal holding member 70 connects the casing 30 to the cover 50. The seal holding member 70 has a pressing face 70a for pressing the O-ring 44 from outside the casing 30, and a welding end 70c to be thermally welded to the cover supporting part 56. The seal holding member 70 is constituted by a material that has a higher shape stability than polyethylene when immersed in the fuel. That is, the mechanical strength of the seal holding member 70 is enhanced by using polyamide or by adding a fibrous material, such as glass fibers, to polyamide, so that the seal holding member 70 has a lower fuel swelling property than polyethylene.

The check valve 60 is provided on the top wall part 32 of the casing 30, and has a ball 61 and a spring 62 for pressing the ball 61 in a valve closing direction. When the float 40 closes the connection conduit 32b and the internal pressure of the tank has a value that is equal to or higher than a predetermined value, the check valve 60 serves as a release valve for relieving the internal pressure of the tank.

Figure 3:
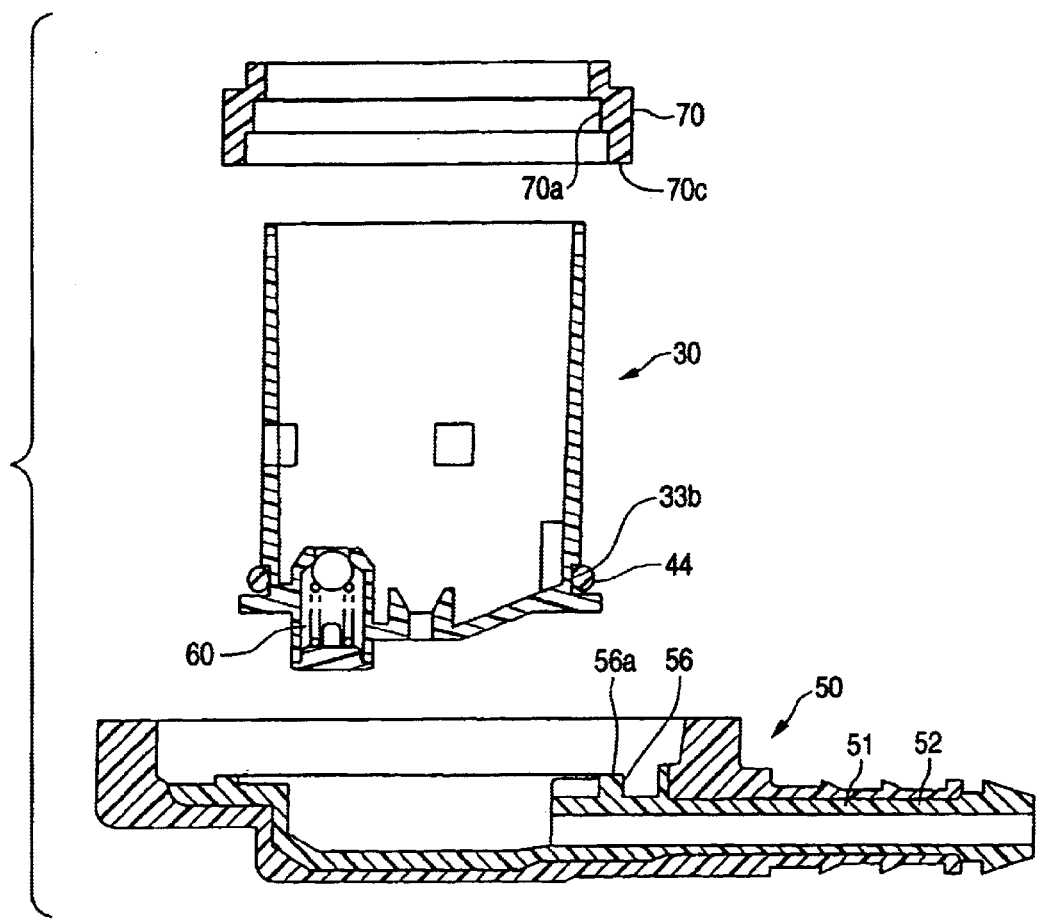
FIG. 3 is an explanatory view showing a process of attaching the fuel cutoff valve 20.

Next, an operation of attaching the fuel cutoff valve 20 to the inside of the body 30 and an operation of mounting the fuel cutoff valve 20 to the tank upper wall FTa of the fuel tank FT are described hereinbelow. As illustrated in FIG. 3, the check valve 60 is attached to the inside of the casing 30 after the cover 50 obtained by forming the cover inner layer 51 and the cover outer layer 52 by two-color molding in such a way as to be integral with each other, the casing 30, and the seal holding member 70 are prepared. Moreover, the O-ring 44 is mounted in the seal holding recess part 33b of the casing 30. Subsequently, the welding end 56 of the cover supporting part 56 is melted by a heating plate (not shown) Moreover, the welding end 70c of the seal holding member 70 is also melted. During this condition, the seal holding member 70 is mounted at an end part of the casing 30 so that the O-ring 44 is pressed by the pressing face 70a of the seal holding member 70. Furthermore, the welding end 70c of the seal holding member 70 is pressed against the welding end 56a of the cover supporting part 56 of the cover 50. Then, when the seal holding member 70 is thermally welded to the cover supporting part 56 of the cover 50, the O-ring 44 is pressed. Moreover, the casing 30 is positioned at and fixed to the cover 50.

Subsequently, as shown in FIG. 2, the float 40 and the spring 46 are accommodated in the valve chamber 30S of the casing 30. Moreover, the position of the bottom end of the spring 46 is adjusted to the spring support part 35c of the bottom plate 35. Moreover, the engagement part 35a of the bottom plate 35 is engaged with the engagement hole 33a of the side wall part 33. Thus, the bottom plate 35 is attached to the casing 30. Consequently, the fuel cutoff valve 20 is attached thereto.

Subsequently, the cover welding end 55a of the cover 50 is melted by a heating plate (not shown). Moreover, a part provided along the periphery of the mounting hole FTc of the fuel tank FT is melted by a heating plate (not shown), so that a melting part FTd is obtained. Then, the casing 30 is inserted into the mounting hole FTc from the lower part thereof, so that the cover welding end 55a is pressed against the welding part FTd. Consequently, the cover welding end 55a and the welding part FTd are made of the same resin material. Thus, when cooled and solidified, both the cover welding end 55a and the welding part FTd are welded to each other. Consequently, when the cover 50 is welded to the tank upper wall FTa, high sealing ability of the fuel tank FT sealed from the outside is ensured.

Next, an operation of the fuel cutoff valve 20 is described hereinbelow. When fuel is supplied into the fuel tank FT by refueling, fuel vapor accumulated in an upper part of the inside of the fuel tank FT is allowed to escape to the canister through the conduit with rising of the level of fuel contained in the fuel tank FT. Then, when the level of the fuel contained in the fuel tank FT reaches a predetermined level FL1, the fuel flows into the valve chamber 30S through the communication hole 35b formed in the bottom plate 35. Thus, a buoyant force is generated in the float 40, so that the float 40 rises, that the connection conduit 32b is closed by the valve part 41a, and that the fuel does not flow into the canister. Therefore, when the fuel is supplied to the fuel tank FT, the fuel vapor is caused to escape from the fuel tank FT. Moreover, the fuel can be prevented from flowing out of the fuel tank FT.

The fuel cutoff valve 20 of such constitution has the following operations and effects.

(1) The seal holding member 70 is a small ring-like member. Thus, the structure of the mold is simple. Consequently, the valve of the invention can be more easily manufactured by injection molding, as compared with the conventional valve described in the foregoing description of the related art.

(2) The casing 30 is made of a resin material (that is, polyacetal) having a lower fuel swelling property than the cover 50. Thus, the seat face for opening and closing the connection conduit 32b can be formed with high accuracy.

(3) The seal holding member 70 thermally welded to the cover supporting part 56 has a high degree of shape stability against fuel. Thus, even when exposed to the fuel, the seal holding member 70a does not largely swell. The seal holding member 70 reliably holds the sealing member by the pressing face 70a. Consequently, high sealing ability is maintained.

(4) The seal holding member 70 is thermally welded to the cover supporting part 56. The sealing ability of a part provided therebetween can be enhanced. Moreover, the supporting force for supporting the casing 30 can be increased. Thus, the casing 30 does not have shakiness. Therefore, the fuel cutoff valve 20 does not cause troubles due to shakiness. That is, the fuel cutoff valve can obtain stable opening/closing characteristics without causing reduction in impact resistance and variation in level of fuel when the fuel cutoff valve 20 opens and closes.

(5) The O-ring 44 is compressed in a radially inner direction thereof, which is perpendicular to a welding (or axial) direction in which the seal holding member 70 is welded. Thus, a predetermined sealing force can be provided without being affected by variation in welding location.

(Second Embodiment)

Figure 4:
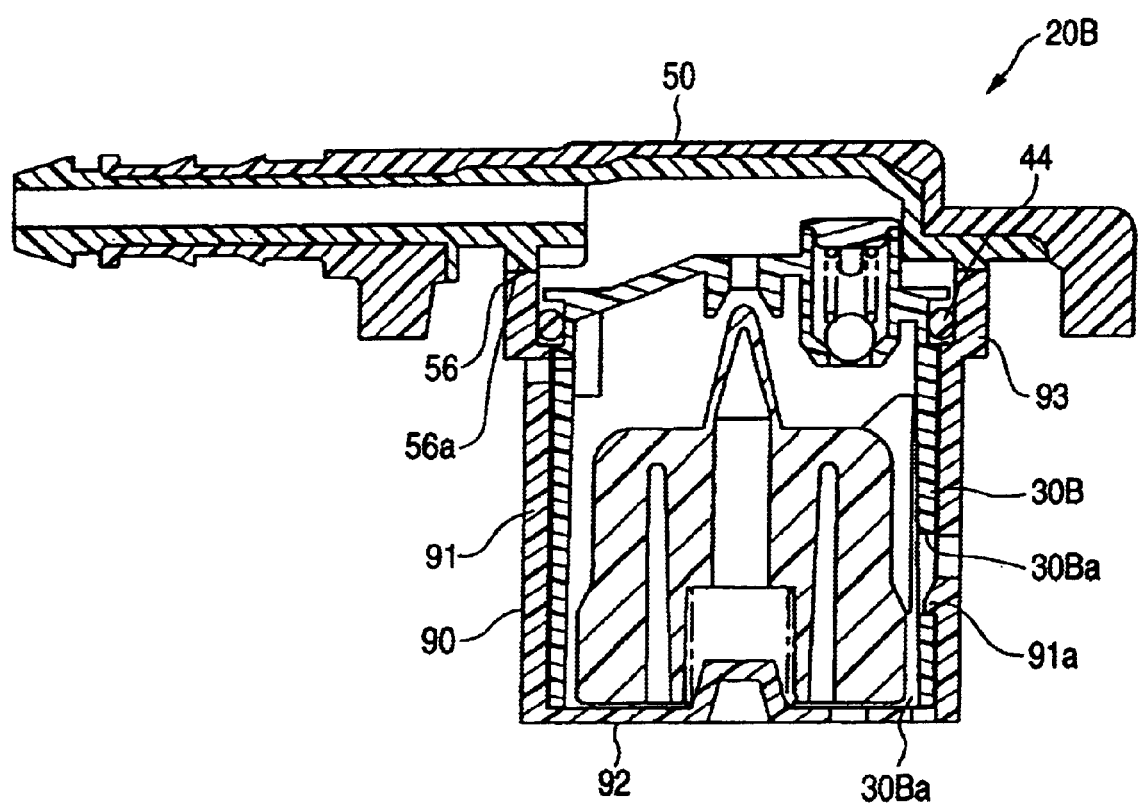
FIG. 4 is a sectional view showing a fuel cutoff valve 20B according to a second embodiment.
Figure 5:
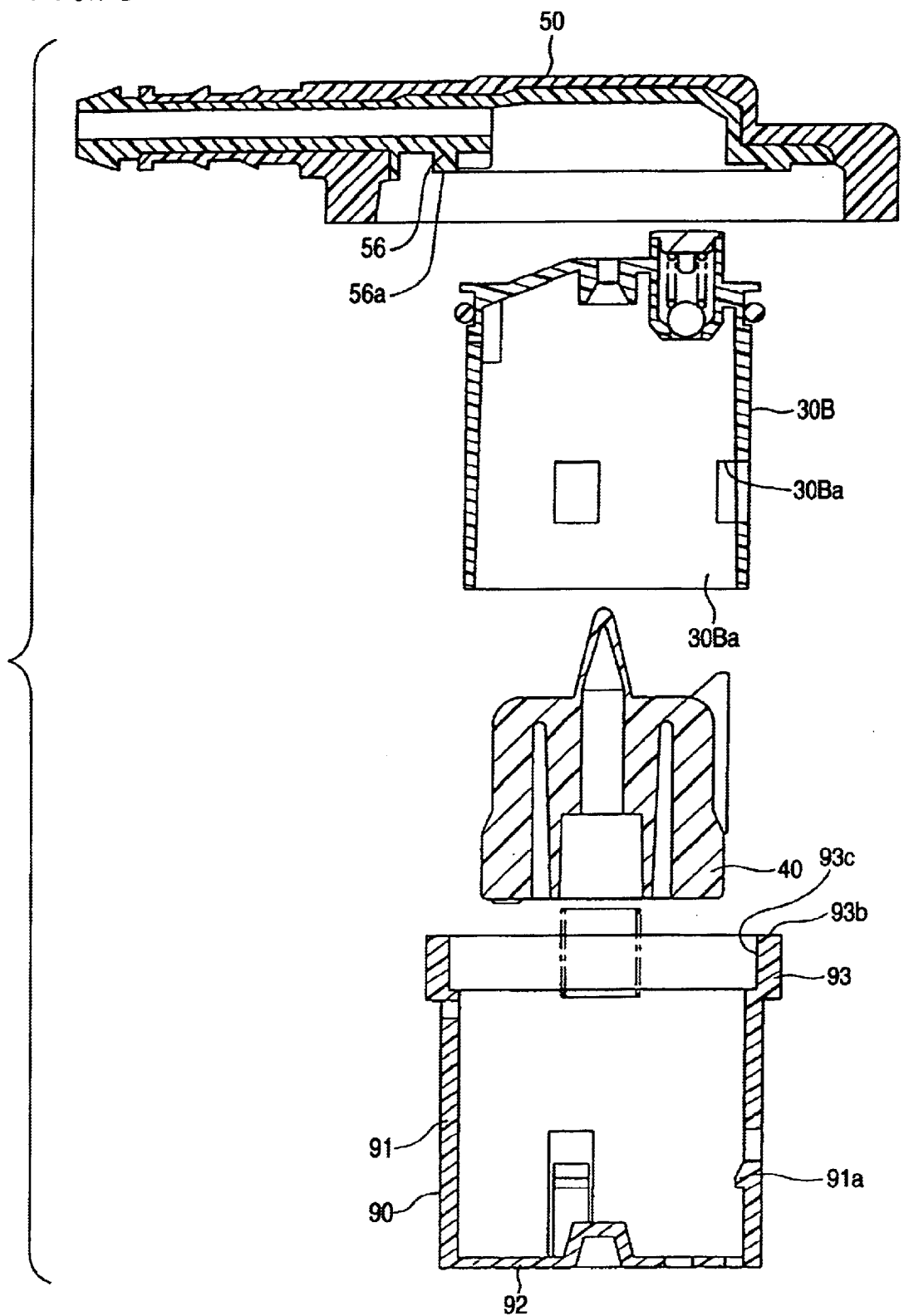
FIG. 5 is a decomposed view showing the fuel cutoff valve 20B.
Figure 6:
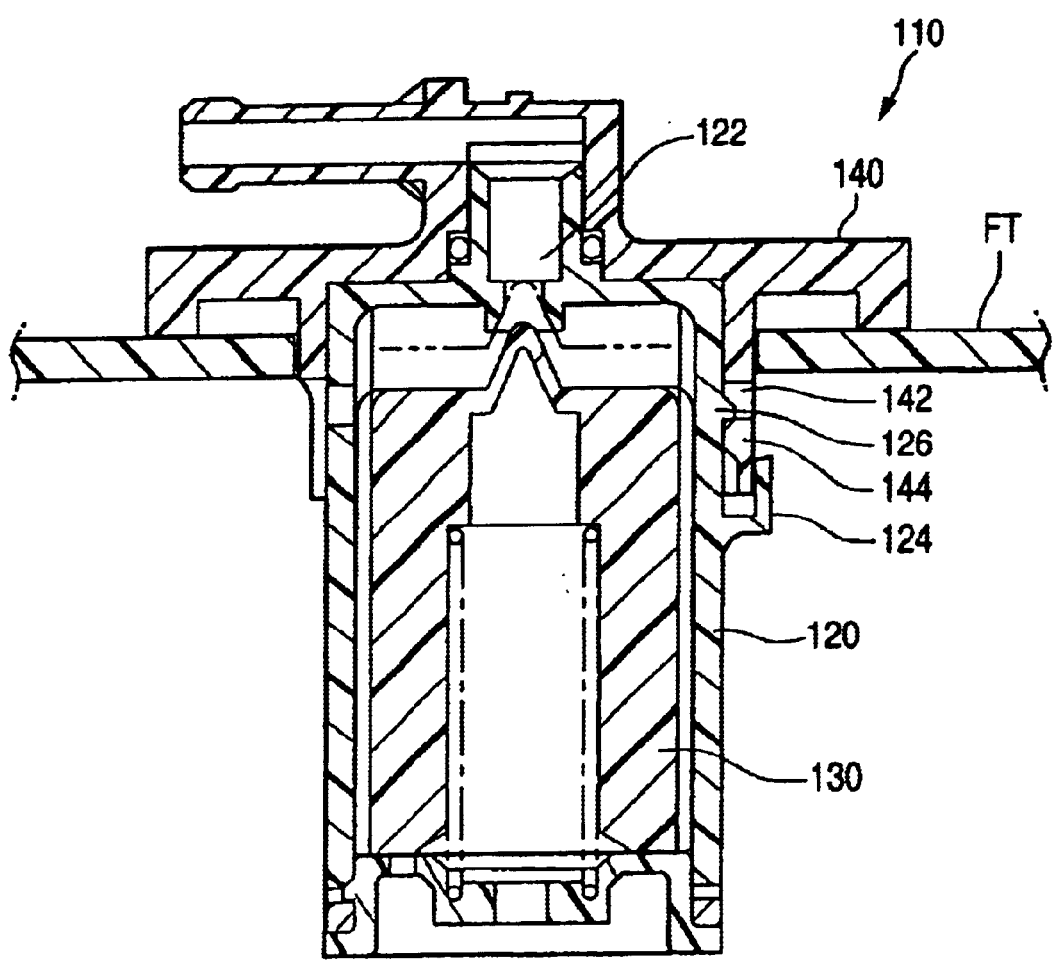
FIG. 6 is a sectional view showing a conventional fuel cutoff valve.

FIG. 4 is a sectional view showing a fuel cutoff valve 20B according to a second embodiment. FIG. 5 is a sectional view showing a condition in which the fuel cutoff valve 20B is attached to a fuel tank. The second embodiment features a configuration of the valve having a case cover 90, whose bottom plate is formed in such a way as to be integral with a seal holding member. That is, the case cover 90 is formed by integrally forming a side wall 91, a bottom wall 92, which covers a lower opening 30Ba, and a seal holding member 93 provided in the upper part of the side wall 91, and shaped like a cup. The seal holding member 93 has a pressing face 93c for pressing the O-ring 44 from outside the casing 30B, and a welding end 93b to be thermally welded to the cover supporting part 93. An engagement claw 91a is formed on the inner periphery of the side wall 91, and engaged with an engagement hole 33Ba of a casing 30B, so that the positioning of the casing 30B is performed in the case cover 90. Further, the seal holding member 93 supports the O-ring 44 and is welded to the welding end 56a of the cover supporting part 56 of the cover 50.

According to the configuration of the fuel cutoff valve 20B, the seal holding member 93 also serves as the bottom plate (see FIG. 1). Thus, the second embodiment has effects of reducing the number of components, in addition to the effects of the first embodiment. Moreover, the case cover 90 also acts as a member for mechanically protecting the casing 30B. Thus, the casing 30B can be formed in such a way as to have a shape, which is determined by regarding the sealing ability as important, and a large thickness. Moreover, the range of choice of a material of the casing 30B can be extended. Furthermore, the attachability of the fuel cutoff valve 20B can easily be enhanced, similarly as that of the first embodiment.

Incidentally, this invention is not limited to the embodiments. This invention may be embodied in many other modes without departing from the gist thereof. For example, the following modifications may be made.

(1) In the foregoing description of the embodiments, it has been described that the cover is constituted by two layers. The cover according to the invention is not limited thereto. For instance, the cover may be constituted by a single layer made of polyethylene. In this case, the invention can be applied thereto by forming the seal holding member from a resin material obtained by adding a fibrous material to polyethylene. Thus, thermal weldability thereof can be ensured. Moreover, the shape stability thereof can be enhanced.

(2) A configuration including an insert member embedded in a position, in which the insert member surrounds the sealing member, may be employed as another means for enhancing the shape stability of the seal holding member. Incidentally, the embedding of the insert member may be achieved by embedding a ring-like metallic member or a resin member, whose mechanical strength is higher that of the seal holding member.

What is claimed is:

1. A fuel cutoff valve adapted to be mounted on an upper part of a fuel tank for switching communication and cutoff between an inside and an outside of said fuel tank by opening and closing a connection conduit, said fuel cut off valve comprising:

a casing forming a valve chamber communicating with said fuel tank;

a cover including a cover welding end that is made of a first resin material, which is thermally weldable to said upper part of said fuel tank, and that is configured to be thermally welded to said upper part of said fuel tank, and a cover supporting part for supporting an upper part of said casing;

a valve element accommodated in said valve chamber to open and close the connection conduit;

a sealing member disposed on an outer periphery of said casing;

a seal holding member that is made of a second resin material, which is thermally weldable to said cover supporting part, and that has a higher shape stability against fuel than said cover, said seal holding member including a pressing face adapted to press said sealing member from an outside of said casing and a holding-member-side welding end configured to be thermally welded to said cover supporting part so as to press said sealing member, thereby sealing the inside of said fuel tank from the outside and supporting said casing.

2. A fuel cutoff valve according to claim 1, wherein said seal holding member is formed by adding a fibrous material thereinto so as to have a higher shape stability than said cover.

3. A fuel cutoff valve according to claim 2, wherein said casing is made of a material selected from a group consisting of polyacetal, polyamide, polyphenylene sulfide, and polybutylene terephthalate or of a blend of the materials of the group, wherein said cover is made of polyethylene and wherein said seal holding member is made of polyethylene.

4. A fuel cutoff valve according to claim 2, wherein said cover includes a cover inner layer which is formed so as to face said connection conduit and on which said cover supporting part is formed, and a cover outer layer that which is formed so as to be brought into intimate contact with said cover inner layer by two-color molding and on which said cover welding end is formed, and wherein said casing is made of a material selected from a group consisting of polyacetal, polyamide, polyphenylene sulfide, and polybutylene terephthalate or of a blend of the materials of the group, wherein said cover outer layer is made of polyethylene, and wherein said cover inner layer is made of modified polyamide that is thermally weldable to polyethylene, and wherein said seal holding member is made of polyamide.

5. A fuel cutoff valve according to claim 1, wherein said seal holding member is made of a resin material having a lower fuel swelling property than a material of said cover so that said seal holding member has a higher shape stability than said cover.

6. A fuel cutoff valve according to claim 5, wherein said cover includes a cover inner layer which is formed so as to face said connection conduit and on which said cover supporting part is formed, and a cover outer layer which is formed so as to be brought into intimate contact with said cover inner layer by two-color molding and on which said cover welding end is formed, wherein said casing is made of a material selected from a group consisting of polyacetal, polyamide, polyphenylene sulfide, and polybutylene terephthalate or of a blend of the materials of the group, and wherein said cover outer layer is made of polyethylene, said cover inner layer is made of modified polyamide that is thermally weldable to polyethylene and polyamide, and said seal holding member is made of polyamide.

7. A fuel cutoff valve according to claim 1, wherein said seal holding member has a casing cover integrally formed with said casing so as to cover a side wall and a lower opening of said casing.

8. A fuel cutoff vale according to claim 1, wherein said seal member has a ring-like shape and performs a sealing by compressed with said seal holding member in a radially inner direction thereof, which is perpendicular to a direction of thermally welding said casing to said cover.

9. A fuel cutoff vale according to claim 1, wherein said cover is made of a blend of modified polyamide and polyethylene, and said seal holding member is made of polyamide.

* * * * *